Oct. 5, 1937.  W. LINTERN  2,094,800

VENTILATING AND/OR WEATHERPROOFING UNIT FOR VEHICLE BODIES

Filed April 5, 1935

INVENTOR.
William Lintern,
BY
ATTORNEY.

Patented Oct. 5, 1937

2,094,800

UNITED STATES PATENT OFFICE 2,094,800

VENTILATING AND/OR WEATHERPROOFING UNIT FOR VEHICLE BODIES

William Lintern, Cleveland, Ohio, assignor, by mesne assignments, to Evans Products Company, Detriot, Mich.

Application April 5, 1935, Serial No. 14,874

8 Claims. (Cl. 98—2)

This invention relates to an improved ventilator for vehicle bodies and particularly to a ventilator to be used on the exterior of the body for air ejection.

As more fully set forth in United States Letters Patent of William Lintern et al., No. 1,958,056, issued May 8, 1934, and other patents therein identified, it has been found that upon forward motion of a vehicle body, a large volume of the relatively onrushing air is deflected upwardly by the vehicle front wall and forms a swift flowing stream which rises above the top of the body and impinges on the relatively rearwardly moving air stream flowing thereabove. The impingement of these air streams creates a zone of low atmospheric pressure over the forward portion of the top of the body and closely adjacent the level thereof, this zone being of such capacity that air may be continuously drawn from the interior of the body thereby in a volume far in excess of that required for effective ventilation of the interior of the body.

As set forth in the above identified patents, the most effective portion of this zone is closely adjacent the front wall of the body. In the types of bodies now used, the front portion of the top underlying this zone generally slopes on a gradual curve downwardly and merges with the front wall of the body. Again, in the newer types of bodies, the top walls curve downwardly from their center portions toward their outer limits across this portion, the degree of curvature varying with substantially each model of vehicle and for different portions of the top wall. It has become necessary, therefore, to provide some means for weatherproofing the opening in the top of the body both against direct infiltration and drainage, which means may be easily and readily installed and may be fit economically to the various shapes of body top walls.

The principal object of the present invention is to provide a simple and effective weatherproofing and ventilating unit for use in connection with vehicle bodies which may be fitted to and in sealing engagement with various types and shapes of body walls and which may be manufactured economically and readily installed.

Another object is to provide a ventilating unit for such purpose which is entirely weatherproof and which will meet the most exacting tests therefor.

Other objects and advantages will become apparent from the following specification wherein reference is made to the drawing in which Fig. 1 is a fragmentary side elevation of a vehicle body showing one of the units installed in operating position;

Figure 1:
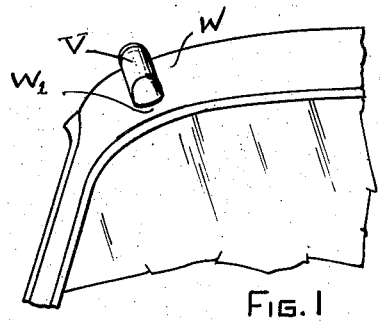
Figure 2:
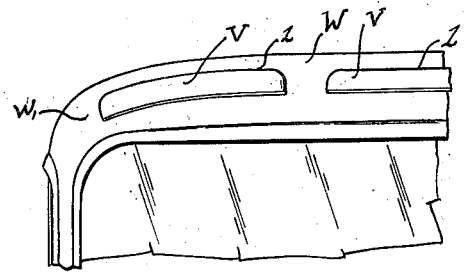
Fig. 2 is a front elevation of the unit and vehicle structure illustrated in Fig. 1.
Figure 7:
Fig. 7 is a diagrammatic end elevation of the ventilating unit installed on the forward portion of the roof.

Referring more specifically to the drawing, a number of ventilating units, designated generally as V, are shown installed on the forward curved portion of the top wall W of a vehicle body, the top wall being of the type which is curved not only downwardly forwardly toward the front wall but also downwardly toward the side walls, as indicated at W₁.

Figure 4:
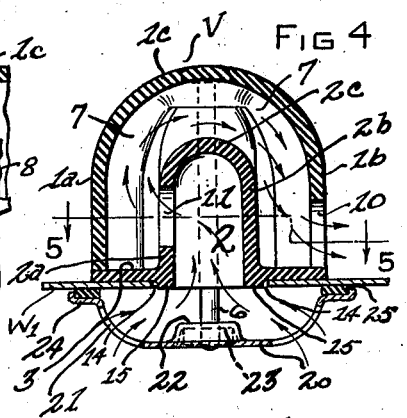
Fig. 4 is a vertical cross sectional view and is taken on a plane indicated by the line 4—4 of Fig. 3.
Figure 5:
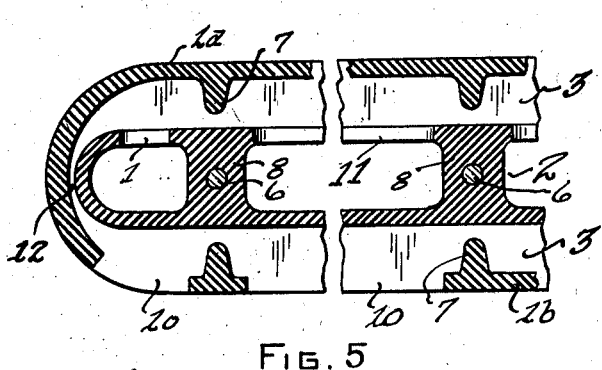
Fig. 5 is a horizontal sectional view of the unit and is taken on a plane indicated by the line 5—5 of Fig. 4.

The ventilating unit may comprise an outer shell or casing 1 which, as better illustrated in Fig. 4, is substantially U-shaped in vertical cross section so as to define a front wall 1a and a rear wall 1b, with a curved top wall 1c merging with the two at their upper limits. The casing 1 is open at the bottom and cooperates with a baffle 2 to form the complete unit. The baffle 2 likewise may comprise a substantially U-shaped shell having front, rear and top walls designated respectively as 2a, 2b and 2c substantially parallel to the corresponding walls of the casing 1. The baffle 2, however, is smaller in cross section than the shell 1, and when the two are assembled for cooperation, as will be described hereinafter, it defines therewith a discharge passage for air.

At the free ends of its side walls, the baffle 2 is provided with flanges 3, formed integral with the baffle and extending outwardly therefrom forwardly and rearwardly a sufficient distance to underlie and be engaged by the free edges of the walls 1a and 1b of the casing 1, as illustrated in Fig. 4. Spaced along the top wall 2c of the baffle 2 are integral exterior bosses 4. Correspondingly, on the top wall of the casing 1 and depending therefrom are cooperating bosses 5, one for each of the bosses 4. The top face of the bosses 4 and under face of the bosses 5 are preferably flat plane surfaces and extend such a distance from the walls by which carried that they snugly engage each other when the free ends of the walls 1a and 1b are in firm sealing engagement with the flanges 3 of the baffle.

Corresponding complementary bosses of the casing and baffle are provided with aligned bores for receiving therethrough suitable bolts 6 for mounting both the casing and baffle on the vehicle top wall, as will later be described. The casing 1 is preferably reinforced interiorly along those portions of its front and rear walls adjacent the bosses 5 by integral enlargements 7 which extend from the bosses 5 to the free ends of the walls 1a and 1b so as to abut the flanges 3 of the baffle at their lower ends. The baffle is likewise reinforced at the portions aligned with the bosses 4 and enlargements 7 by integral solid portions 8, thus affording greater rigidity in the resultant structure.

The rear wall 1b of the casing 1 is provided with a series of openings 10 which communicate with the outside atmosphere and preferably extend from the level of the top of the flange 3 of the baffle upwardly about one third to one half the height of the baffle rear wall. The front wall 2a of the baffle is provided with passages 11 of comparable capacity to the passages 10, the passages 11 being disposed vertically of the wall 2a about midway between the upper and lower limits of the baffle. The passages 11 communicate at one end with the passage formed between the casing 1 and baffle 2 and at the other end, with the interior of the baffle. Both the passages 10 and 11 are preferably of the same total area as the cross sectional area of the passage formed between the baffle and casing. Thus if rain or foreign matter is blown directly into the passages 10, it first strikes the rear wall 2b of the baffle and is prevented from passing thereinto. If any portion of such water or foreign matter is carried over the top of the baffle, it may drain down the inner wall of the casing 1 or outer wall of the baffle onto the flange 3. Since the opening 11 terminates at its lower limit above the lever of the flange 3, the water will not flow into the opening 11. The baffle 2 terminates endwise in slightly spaced relation to the end walls of the casing to form passages 12 so that any water disposed on the flange 3 in front of the baffle may drain therearound and out through the passages 10.

In installing the unit, the wall W is provided with one or more openings 14 which communicate with the interior of the body and the exterior low pressure zone. The baffle 2 and casing 1 are placed together and then placed on top of the wall so that the interior of the baffle is aligned with the body openings. Suitable shoulders 15 may be provided, if desired, at the free edges of the baffle walls and may protrude below the flanges 3 for aligning the baffle properly with respect to the openings 14. When in such position, the flanges 3 overlie the adjacent portion of the top wall W1. The bolts 6 are then passed through the aligned bores in the bosses 4 and 5 of the casing and baffle, and downwardly through the very same openings 14 in the wall of the body that are provided for ventilation.

It should be noted that the bolts are positioned so as to pass directly through the opening in the top wall of the body so as to eliminate the necessity of any other fastening or operation on the top wall of the body itself. Disposed within the body is a suitable shield or grill 20, having serrations or slots 21, which admit air to the interior of the baffle 2. At spaced portions along the shield 20 are indentations 22 which accommodate suitable nuts 23. The ends of the bolts 6 protrude through suitable openings in the indentations 22 and are received in the nuts 23. The shield is provided with a peripheral flange 24 which, when the shield is engaged with the bolts 6, lies substantially under the front and rear walls of the casing 1. If desired, a compressible gasket 25 may be provided between the flange 24 and the under side of the top wall. By screwing the bolts tightly into the nuts, the casing and baffle are drawn tightly together and firmly against the outer surface of the top wall while the shield is firmly engaged with the inner surface. Thus the unit is mounted in operating position. The indentations 22 preferably snugly accommodate the nuts in position and prevent turning thereof so that the bolts are easily engaged therein.

As explained above, this operation would be comparatively simple were the unit mounted on a perfectly flat surface. However, in order to form an effective seal between the ventilator and the top wall, it must conform closely to the surface on which installed. Therefore, both the baffle and the casing are formed of material of such resiliency and yieldability that, upon tightening of the bolts, the casing and baffle will be drawn firmly into operating position with respect to each other and will conform exactly to the outer surface of the top wall and snugly engage the same. A moderately resilient rubber is very satisfactory.

Due to this same resiliency, not only will the unit conform to the top wall but may be drawn into more effective sealing contact therewith and distorted slightly for conforming to minor local irregularities in the top wall surface. These important features render the unit adaptable to substantially any vehicle body. In fact, if the unit is to be used other than on the top wall, it may be stressed to conform thereto equally well.

Figure 8:
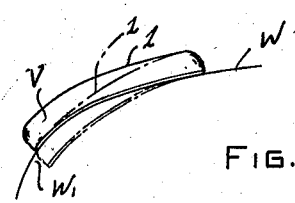
Fig. 8 is a diagrammatic front elevation of the unit and roof portion illustrated in Fig. 7, showing different positions thereof during installation.
Figure 3:
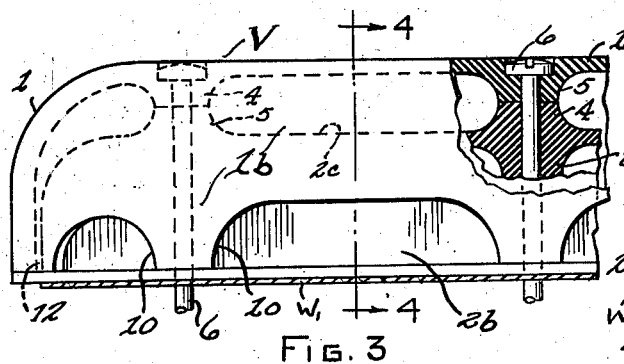
Fig. 3 is a fragmentary rear elevation of the unit, part thereof being shown in section for clearness in illustration.

Since in many instances, the ventilator is placed near the lateral limits of the wall, which is considerably curved, it is preferable that both the shell and baffle be curved, as illustrated by the dot and dash line in Fig. 8, on a curve of sharper radius than of the average wall to which it will be applied. Thus it is not necessary to stretch the unit and perhaps distort the walls thereof to provide a fit. Instead, the top walls of the parts may be slightly compressed as the unit is partially uncurved to fit the vehicle top wall. Thus, if the unit is secured to the body at one end, the remainder thereof tends to clamp more tightly against the vehicle top wall. In this manner the resiliency of the material is additionally utilized for effecting a sealing engagement and any tendency of curling at the ends of the unit is eliminated.

For average use, the unit may be substantially the size and shape illustrated and about twelve inches long, as a ventilating unit of such size will afford adequate air capacity for ventilating the average truck cab or passenger car. The rubber, of course, is of sufficient rigidity to withstand undue distortion and also of a quality to withstand exposure to the atmosphere.

In operation, the ventilator is usually disposed in the low pressure zone. However, were it more removed from the front wall of the vehicle, the front wall 1a of the casing itself would deflect sufficient air to provide a low pressure zone at the opening 10 for effecting a large amount of air flow. When the vehicle is moving forwardly, obviously the air will pass through the slots 21 of the shield 20, through the baffle 2, and then, in turn, through the passage 11, and between and along the channel or passage formed by the baffle and casing 1 and out through the passage 10, as indicated by the arrows in Fig. 4.

Figure 6:
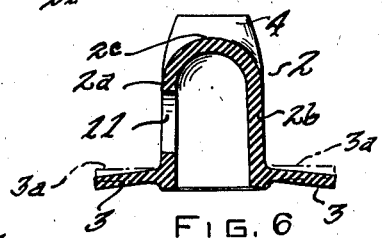
Fig. 6 is a cross sectional view of the baffle insert of the unit showing the same removed from the outer casing.

The flanges 3 of the baffle are preferably normally sloped downwardly from the body toward the outer edges as illustrated in Fig. 6, so that when the baffle is drawn tightly in place, the flanges are stressed upwardly to the position indicated by the dotted line 3a in Fig. 6, thus insuring firm sealing engagement with the top wall of the vehicle body without any tendency to curl up at the outer edges. If desired, white lead or suitable cement may be applied on the vehicle top wall and underside of the flanges 3 for insuring a permanent seal.

Having thus described my invention,

I claim:

1. A ventilating and weatherproofing unit for a vehicle cab having a wall with a ventilating opening therethrough, said unit comprising a body for shielding said opening when the body is mounted on said wall in operating position, said body being of resilient rubber composition whereby it may be warped readily to conform to the wall portion on which it is to be mounted, and said body having a passage for communicating with the wall opening and with the outside air when the body is mounted on the wall.

2. A ventilating unit for a vehicle cab having a wall with a ventilating opening therethrough, said unit comprising a body for shielding said opening when the body is mounted on said wall in operating position, and said body having an opening for communicating the wall opening with the outside air when the body is mounted on the wall, a baffle beneath and within the limits of the body operatively disposed between the said openings when the body is in place on the wall, and said body and baffle being of resilient material whereby they may be warped readily to conform to the wall portion on which it is mounted.

3. A ventilating unit for the purposes described, comprising an elongated outer casing having a top, and front and rear walls depending therefrom, an opening in one wall, a baffle within the casing and having a top, and front and rear walls depending therefrom, an opening in the one of said baffle walls remote from that wall of the casing having the opening, abutment means on the interior of the casing top and co-operating abutment means on the exterior of the baffle top for spacing the tops thereof apart when the abutments are in engagement, the front and rear walls of the baffle being spaced inwardly from the corresponding walls of the casing, whereby a passage communicating with said openings is formed therebetween, and said baffle having a passage communicating with the baffle opening and positioned for communicating with the interior of a vehicle body when the ventilating unit is installed on a wall of the body.

4. A ventilating unit for a vehicle cab having a wall with a ventilating opening therein, said unit comprising a body for shielding said wall opening when the body is mounted on said wall in operating position, said body being of resilient rubber composition, whereby it may be warped readily to conform to the wall portion on which it is to be mounted, said body having a passage for communicating the wall opening with the outside air when the body is mounted on said wall, and the cab wall engaging surface of the body being normally curved in section on a shorter radius than the wall portion to be engaged thereby.

5. A ventilating and weatherproofing unit for a vehicle cab having a wall with a ventilating opening therethrough, said unit comprising a body for sealing said opening when the body is mounted on said wall in operating position, said body being of resilient rubber material whereby it may be warped readily to conform to the wall portion on which it is to be mounted, and said body having a passage for communicating with the wall opening and with the outside air when the body is mounted on the wall.

6. In a vehicle cab having a wall with a ventilating opening therein, a ventilating unit for weatherproofing said opening comprising an outer wall overlying the opening, an inner baffle wall spaced from the outer wall, a bottom wall having portions overlying the said cab wall adjacent the opening, fastening means secured at the outer ends to the outer wall and extending through said outer wall and baffle wall and protruding through the said cab wall opening to the inside of the cab and beyond the cab wall, and means cooperable with the protruding end of said means and engaging the inner surface of the wall of the body for drawing the unit firmly into operative position on the wall.

7. In a vehicle cab having a wall with a ventilating opening therein, a ventilating unit for weatherproofing said opening comprising an outer casing overhanging the opening, an inner baffle spaced from the outer casing and having a bottom wall portion overlying the cab wall about the opening, the baffle having portions spaced from the casing, complementary abutments on the baffle and casing at the top thereof engageable when the casing and baffle are in operating position with respect to each other for maintaining said spaced relation, and means extending through said abutments and baffle and protruding through the cab wall opening to the inside of the body, means cooperable with the other end of said first mentioned means and engaging the inner surface of the wall of the cab for drawing the casing and baffle firmly into operation with respect to each other and with the bottom wall firmly in engagement with the cab wall.

8. A ventilating unit for a vehicle cab wall having a ventilating opening therethrough, said unit comprising a casing overhanging said opening and having forward and rearward walls disposed in front and rear of said opening, an opening in the rear wall of said casing, a baffle member disposed within said casing and having walls including a front wall spaced inwardly from the walls of the casing, an opening in the baffle front wall for communicating with the interior of the cab wall opening when the baffle and casing are installed on the cab wall, thickened portions in the casing and on the baffle at spaced portions therealong, downwardly facing abutment surfaces on the interior of the casing thickened portions, cooperating upwardly facing abutments on the baffle thickened portions, bolts respective to said thickened portions of the casing and extending through the thickened baffle portions and the cab wall opening and protruding therethrough beyond the said cab wall, a shield within the body having openings therethrough for receiving the protruding ends of said bolts and having portions engaging the inner wall portions of the cab wall close to the outer wall portions engaged by the casing, and means on the protruding ends of said bolts engaging the shield for stressing the shield and casing against the portions of the cab wall engaged thereby.

WILLIAM LINTERN.